United States Patent [19]
Mikkelsen et al.

[11] Patent Number: 4,995,469
[45] Date of Patent: Feb. 26, 1991

[54] OPERATOR'S STATION MOUNTING ARRANGEMENT AND METHOD

[75] Inventors: Jan Mikkelsen, Borre; Kjell Sorlie, Tonsberg, both of Norway

[73] Assignee: Caterpillar Industrial Inc., Mentor, Ohio

[21] Appl. No.: 412,048

[22] Filed: Sep. 25, 1989

[51] Int. Cl.⁵ .................. B62D 33/063; B62D 33/077
[52] U.S. Cl. ................................ 180/89.13; 296/190; 180/327
[58] Field of Search .................... 180/89.13, 327, 326, 180/324; 296/190

[56] References Cited

U.S. PATENT DOCUMENTS

| | | |
|---|---|---|
| 3,431,016 | 3/1969 | Mundt-Petersen et al. |
| 3,891,264 | 6/1975 | Hunter, II et al. ................. 296/190 |
| 4,421,188 | 12/1983 | Fredriksen ........................... 296/190 |
| 4,427,090 | 1/1984 | Fredriksen et al. ................. 296/190 |
| 4,790,711 | 12/1988 | Calaway .............................. 180/324 |

*Primary Examiner*—Charles A. Marmor
*Assistant Examiner*—Karin Tyson
*Attorney, Agent, or Firm*—Alan J. Hickman

[57] ABSTRACT

A mounting arrangement which facilitates the positioning of an operator's station on the frame of a work vehicle at a plurality of elevationally spaced apart positions relative to a longitudinal axis of the work vehicle and permits control of the operation of the work vehicle from each of the first and second positions is provided. The mounting arrangement includes first and second elevationally spaced apart frames for supporting the operator's station at the first and second spaced apart locations, respectively. A connecting device connects the operator's station to the first and second frames. A controllable component which is mounted on the vehicle frame is adapted to vary operation of a function of the vehicle. The controllable component is connected to a selecting device mounted on the operator's station by a directing device which passes a control signal from the selecting device to the controllable component. The mounting arrangement is particularly suited for use on a material handling vehicle.

13 Claims, 5 Drawing Sheets

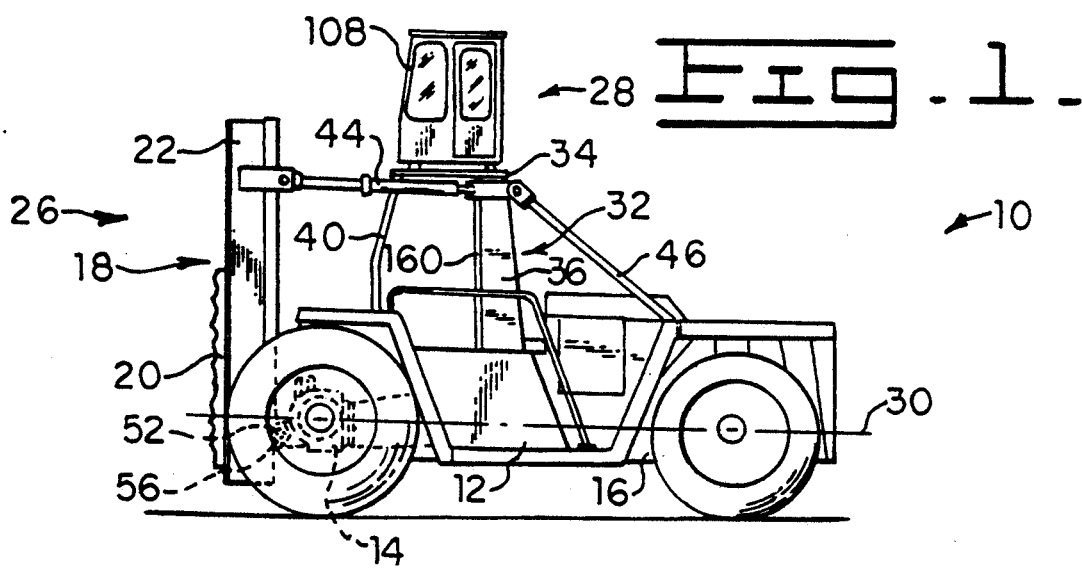
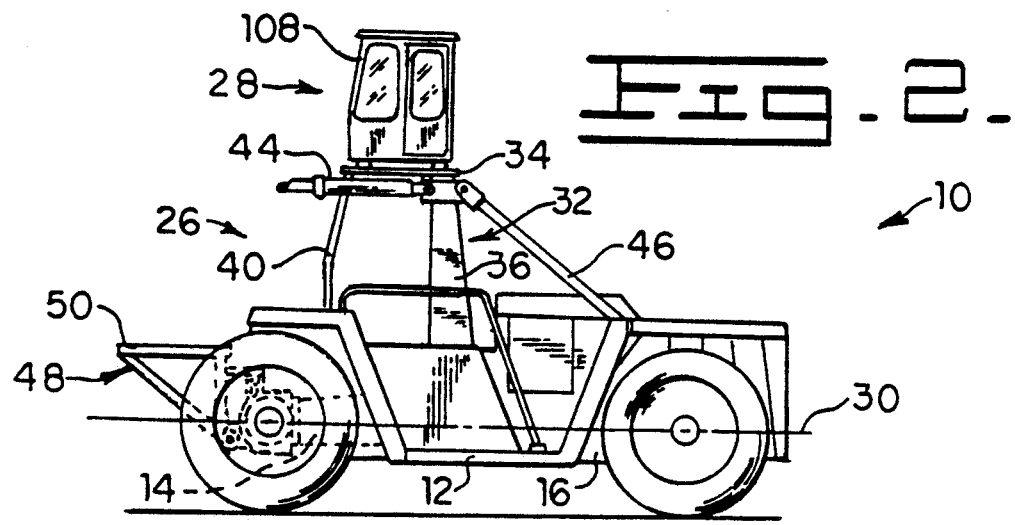
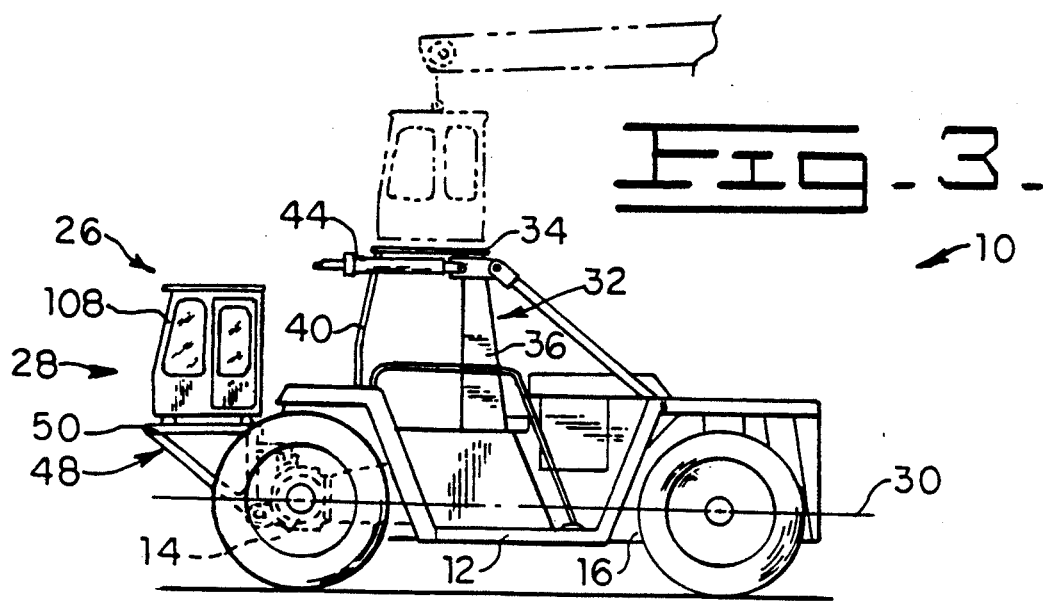

OPERATOR'S STATION MOUNTING ARRANGEMENT AND METHOD

TECHNICAL FIELD

This invention relates to a mounting arrangement and method for facilitating the positioning of an operator's station at elevationally spaced apart locations on a work vehicle and more particularly to a mounting arrangement having first and second frames for supporting the operator's station at first and second elevationally spaced apart locations on the frame of the work vehicle and providing controllable operation of the work vehicle from the cab at either of the first and second locations.

BACKGROUND ART

Work vehicles and particularly vehicles of a substantial size, for example, material handling vehicles, earthworking vehicles, log handling vehicles, and the like have an operator's station mounted thereon which is located a substantial distance from the underlying surface which supports the vehicle. This tends to make transportation and shipping of the vehicle extremely difficult due to overhead clearance limitations on ships as well as along highways. Such operator stations usually have an overhead guard or cab which increases the overall height of the vehicle and makes it even more difficult to be shipped or transported. In order to ship such a vehicle, it is necessary that the operator's station be removed from the vehicle and transported separately from the vehicle. As a result, the potential for damage to and misplacement of the operator's station is extremely high.

The operator's station also includes selecting devices which are actuatable by the vehicle for controlling operation of the vehicle as well as the work implement mounted on the vehicle. Such selecting devices usually includes vehicle steering, brake, accelerator, direction and transmission selectors mounted within the confines of the cab of the operator's station. These selecting devices are each connected to associated controllable components of the vehicle, for example, steering control valve, disc brake actuator, engine governor and transmission control valves, by directing devices such as, fluid conduits, electrical wires, mechanical linkages, cables, and the like. When the operator's station is removed from the vehicle, the conduits, wires, cables, linkages and like must be disconnected. As a result, the vehicle is no longer drivable and must be towed, pushed, or lifted for placement purposes on the chosen type of transportation device. Such vehicles often weigh many tons and are of such an enormous size that any movement of the vehicle is extremely difficult and requires many hours of concentrated effort on the part of those involved in transportation by ocean going vessel, towed trailer, and railroad.

In addition to the above, disconnection of the hydraulic lines, electrical conductors, linkages, and cables creates additional problems and expense. Disconnection of the hydraulic lines often results in spillage of hydraulic fluid, a condition that should be avoided if at all possible. The disconnection of the electrical conductors, linkages and cables requires a lashing down to prevent inadvertent movement during transport. This not only takes time but often results in bending and breakage of the conduits, conductors, cables and linkage which ultimately results in the need for replacement. It is therefore advantageous to eliminate the need for disconnecting these directing devices from one or both of the controllable components and selecting devices.

The present invention is directed to overcoming one or more of the problems as set forth above.

DISCLOSURE OF THE INVENTION

In one aspect of the present invention, a mounting arrangement is provided for facilitating the positioning of an operator's station on the frame of a work vehicle at a plurality of elevationally spaced apart positions relative to a longitudinal axis of the work vehicle and permitting control of the operation of the work vehicle from each of the positions. The mounting arrangement includes a first frame having a supporting portion and being connected to the vehicle frame. The supporting portion is spaced a preselected elevational distance from the longitudinal axis and defines a first position at which the operator's station is supportable. A second frame having a supporting portion is connected to the vehicle frame. The supporting portion of the second frame is elevationally spaced from the supporting portion of the first frame and defines a second elevational position at which the operator's station is supportable. A controllable component is mounted on the vehicle frame at a location spaced from the operator's station and is adapted to vary operation of a function of the vehicle in response to receiving a control signal. A selecting device which is mounted on the operator's station delivers a control signal in response to selective manual actuation of the selecting device. A directing device connected to and between the controllable component and the selecting device passes the control signal from the selecting device to the controllable component. A connecting device connects the operator's station to the supporting portion of the first and second frames. The directing device remains connected to and between the selecting device and the controllable component at each of the first and second positions of the operator's station and the vehicle is controllable from the operator's station at both of the first and second positions.

A method for relocating a cab of the material handling vehicle from a first elevational location on a frame of the vehicle spaced from a longitudinal axis of the vehicle to a second elevational location on the vehicle frame spaced from the first elevational location, said material handling vehicle being controllably driven from the cab at both the first and second elevational locations, includes the steps of: releasing the cab from connection to a supporting portion of a first frame mounted on the vehicle frame; lifting the cab from being supported at said first elevational location on the first frame; placing the cab at a second elevational location on a supporting portion of the second frame connected to the vehicle frame; and connecting the cab to the supporting portion of the second frame at the second elevational location.

The mounting arrangement enables the vehicle to be drivingly controlled at either of the first and second positions of the operator's station and therefore reduces the cost complexity and time required in maneuvering the vehicle for transportation purposes. Further such capability is done in a simple manner without requiring disconnection of the passing devices connected to and between the operator's station and the controllable components on the vehicle frame. As a result, damage to the passing device and spillage of hydraulic fluid is eliminated.

BRIEF DESCRIPTION OF THE DRAWINGS

FIG. 1 is a diagrammatic side elevational view of one embodiment of the present invention showing a material handling vehicle having an operator's station mounted on a first frame connected to a frame of the vehicle and a lift mast assembly pivotally connected to a front one end of the vehicle frame;

FIG. 2 is a diagrammatic side elevational view of a material handling vehicle similar to FIG. 1 showing the lift mast assembly removed from connection with the vehicle frame and a second frame connected to the vehicle frame;

FIG. 3 is a diagrammatic side elevational view of the material handling vehicle of FIG. 2 showing the operator's station moved from a first elevational location on the first frame to a second elevational location on the second frame;

BEST MODE FOR CARRYING OUT THE INVENTION

Figure 4:
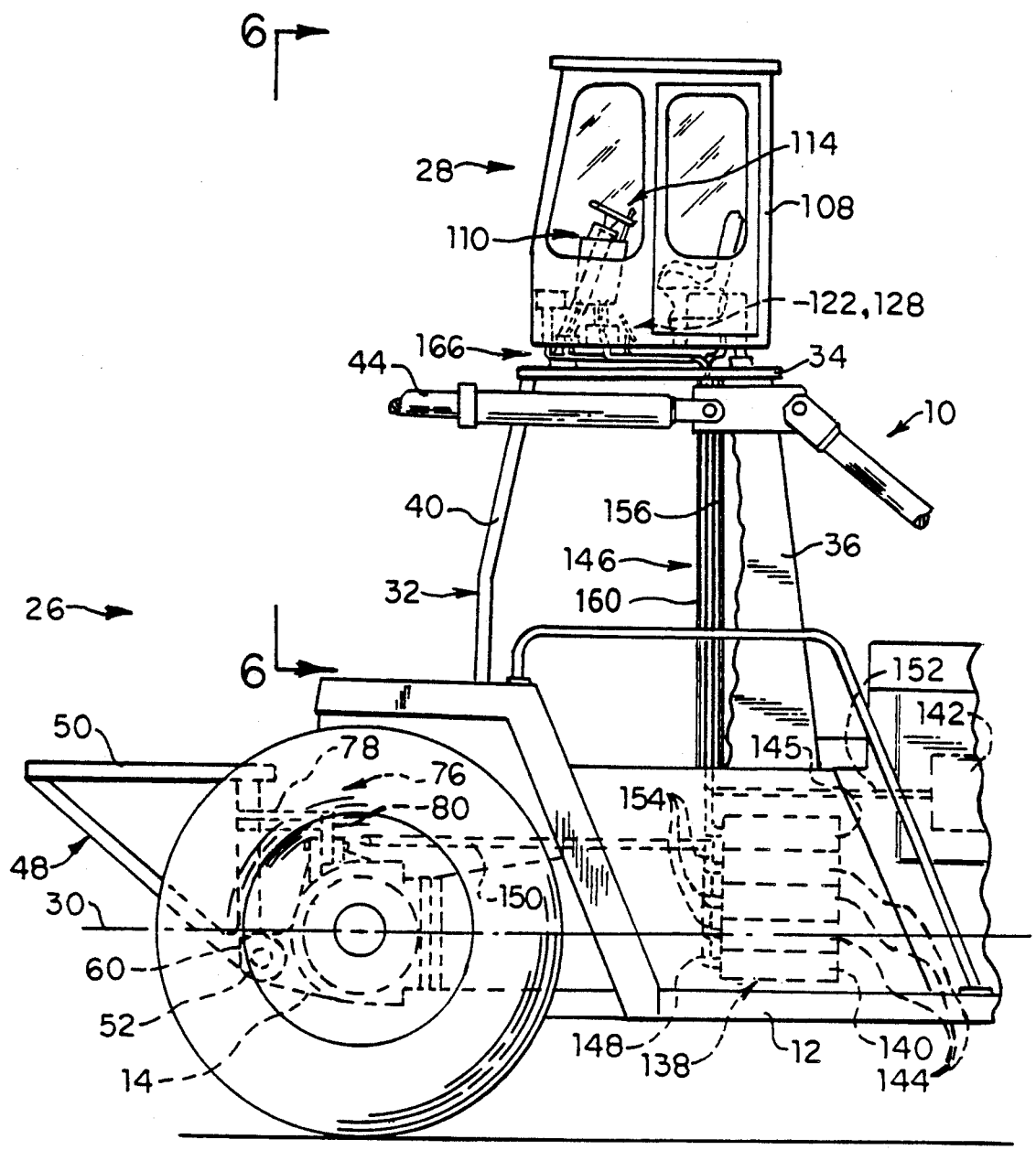
FIG. 4 is a diagrammatic enlarged view of the material handling vehicle of FIG. 2 showing various controllable components of the vehicle being connected to a selecting means by a directing means.

With reference to the drawings, a work vehicle 10, shown as a material handling vehicle of the container handling type, has a frame 12 which has front and rear end portions 14, 16 and a lift mast assembly 18 (Which is only partially shown in FIG. 1 and FIG. 7) pivotally connected to the front end portion 14 of the material handling vehicle frame 12. The lift mast assembly 18 has a carriage 20 mounted thereon and elevationally moveable along first and second spaced apart parallel uprights 22, 24 which are pivotally connected to the front end portion of the vehicle frame 12 in a manner hereinafter to be described. A container handling attachment of a conventional design (not shown) is connected to the carriage 20 and provided for engaging a container (not shown) to be lifted and latching on to the container to be lifted. The lift mast assembly 18 elevationally moves the carriage 20 and thereby raises or lowers the container handling attachment and the container attached thereto so that the container may be picked up, transported and deposited.

A mounting arrangement 26 is provided for facilitating the positioning of an operator's station 28 on the vehicle frame 12 of the work vehicle 10 at a plurality of elevationally spaced apart positions relative to a longitudinal axis 30 of the work vehicle 10 and permits control of the operation of the work vehicle 10 from each of the elevationally spaced apart positions. The operator's station includes a rollover protection structure or a falling object protection structure, and/or a cab 108. The particular construction may be of any suitable well known configuration. The longitudinal axis 30 preferably passes through the center of gravity of the vehicle and extends between the front and rear end portions 14, 16 of the vehicle frame 12.

A first frame 32 has a supporting portion 34 and is connected to the vehicle frame 12. Specifically, the first frame has first, second, third, and fourth spaced apart legs 36, 38, 40, 42 which are constructed of tubular stock. The legs 36, 38, 40, 42 are connected at one end portion to the supporting portion 34 in any suitable manner such as by welding, threaded fasteners, and the like and at the other end portion to the vehicle frame 12 in any suitable manner such as by welding, threaded fasteners, and the like. The supporting portion 34 is spaced a first preselected elevational distance from the longitudinal axis 30 and defines a first position at which the operator's station 2 is supported. Supporting portion 34 is preferably of a rectangular configuration and formed of channel or other suitable formed stock to provide sufficient rigidity. It is to be noted that the distance between longitudinal axis 30 and the supporting portion 34 places the location of the operator's station at a substantial distance from the surface upon which the vehicle 10 is supported. The location of the operator's station in the particular embodiment is referred to as high mounted operator's station by those skilled in the art and particularly beneficial for container handling operations. The high mount location provides the operator with the ability to readily see the container handling frame so that he can accurately position the container handling frame on the container and eliminate the guess work encountered when a traditional lower mounted operator's station is utilized. With the operator's station mounted at the first preselected elevational distance the ability to transport the vehicle on highways, by railway, or load the vehicle for transportation in the hold of a ship is impossible. Therefore it is necessary that the operator's station 28 be removed from the vehicle 10 for overhead clearance purposes. This is the case for both traditional and high-mount operator, station because of the enormous size of the vehicle 10. Once the operator's station is removed, the vehicle 10 is rendered inoperative since all the vehicle controls are located at the operator's station.

A pair of tilt cylinders (only one shown) 44 are pivotally connected at opposite ends of each cylinder 44 to the first and second uprights 22, 24 and the first and second legs 36, 38 respectively. A pair of spaced apart struts 46 (only one shown) are connected at opposite ends to the first and second legs 36, 38 and the vehicle frame 12, respectively. These struts resist buckling, twisting, and other deformable loading of the first frame 32 caused by tilt cylinder 44 loading during normal work cycle operation. The pivoting load of the loaded lift mast assembly 18 is applied to the first frame 32 by the tilt cylinders 44.

Figure 5:
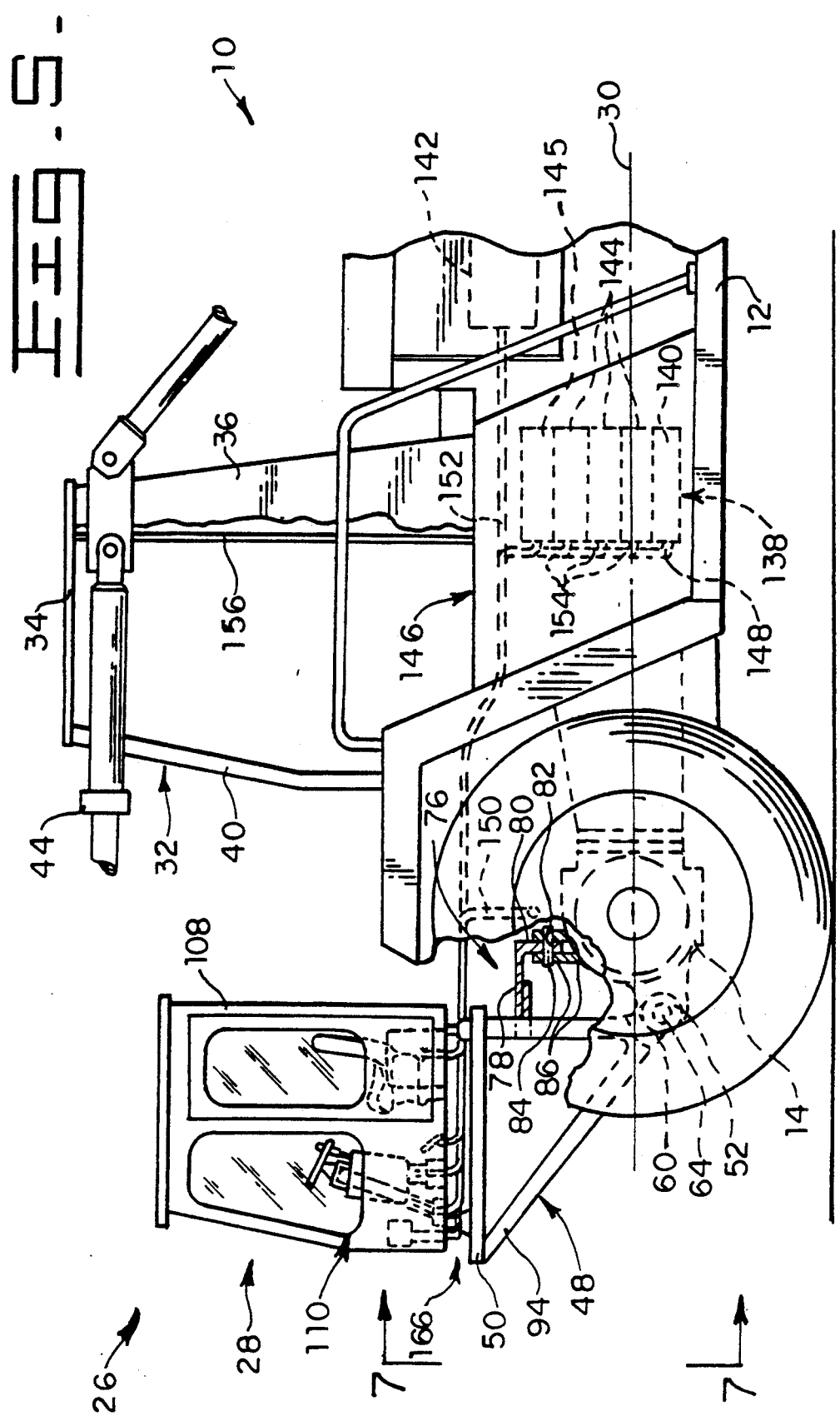
FIG. 5 is an enlarged diagrammatic side elevational view of the material handling vehicle of FIG. 3 showing the cab at the second elevational location and the directing means connected to the controllable components and selecting means.
Figure 7:
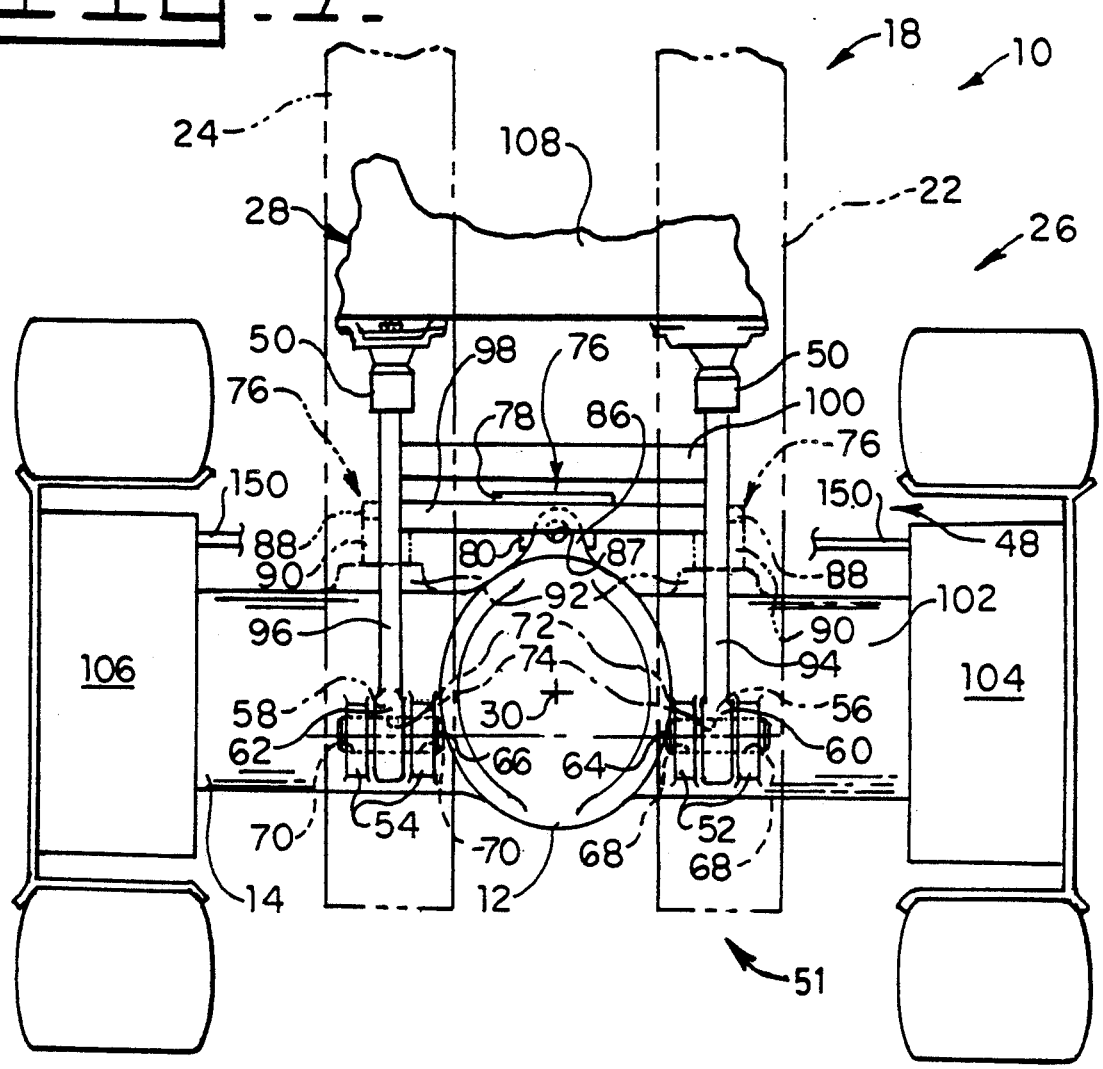
FIG. 7 is a front diagrammatic elevational view of FIG. 5, taken along lines 7—7 of FIG. 5, showing the second frame mounting to the vehicle frame in greater detail and showing one embodiment of a stop in solid lines and the alternate embodiment of the stop in phantom lines.

As best seen in FIGS. 5 and 7, a second frame 48 has a supporting portion 50 and is connected to the vehicle frame 12 at the front end portion 14 thereof. The second frame supporting portion 50 is elevationally spaced from the first frame supporting portion 34 and defines a second elevational position at which the operator's station 28 is supportable.

Means 51 is provided for releasably connecting a selected one of the lift mast assembly 18 (particularly the first and second uprights 22, 24) and the second frame 48 to the vehicle frame 12. In particular the means 51 includes first and second pairs of spaced apart ears 52, 54 which are mounted at spaced apart locations on the front end portion 14 of the vehicle frame 12. The lift mast assembly 18 has a pair of first and second spaced apart flanges 56, 58 mounted on the first and second uprights 22, 24, respectively, and the second frame 48 has first and second spaced apart flanges 60, 62. The first and second flanges 56, 58 are disposable between the ears of the first and second pairs of ears 52, 54, respectively, and pivotally connected to the first and second pairs of ears 52, 54 by first and second shafts 64, 66. Alternatively, and in a similar manner, the first and second flanges 60, 62 of the second frame 48 are disposable between the ears of the first and second pairs of ears 52, 54 and pivotally connected to the first and second pairs of ears 52, 54 by the same or equivalent first and second shafts 64, 66. The first pair of spaced apart ears 52 each have axially aligned apertures 68 disposed therethrough and the second pair of spaced apart ears each have axially aligned apertures 70 disposed therethrough. Likewise the first and second lift mast flanges 56, 58 have axially aligned apertures 72 disposed therethrough and the first and second flanges 60, 62 of the second frame 48 have axially aligned apertures 74 disposed therethrough. The first shaft 64 is disposable in apertures 68 and either aperture 72 or 74, depending on which one of the lift mast assembly 18 and second frame 48 are to be pivotally secured to the frame 12, and the second shaft 66 is disposable in apertures 70 and either aperture 72 or 74, depending on which one of the lift mast assembly 18 and second frame 48 are to be pivotally secured to the vehicle frame 12. It is to be noted that the first and second pairs of ears 52, 54 and first and second shafts 64, 66 connect either of the lift mast assembly 18 and the second frame 48 to the first end portion 14 of the vehicle frame 12.

Figure 8:
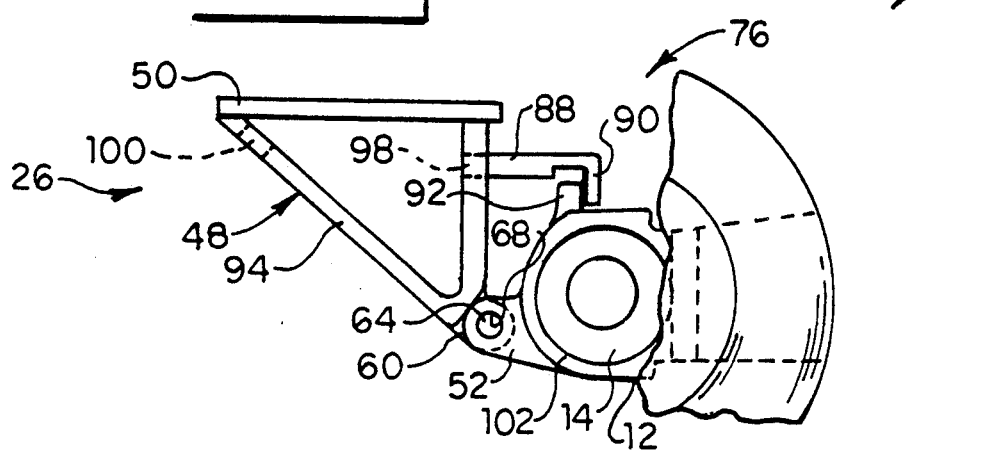
FIG. 8 is a side diagrammatic elevational view of an alternate embodiment of the mounting of the second frame to the vehicle frame.

The mounting arrangement 26, as shown in FIGS. 5, 7, and 8 includes, a stop 76 which is connected to the second frame 48 at a location on the second frame 48 spaced from the first and second spaced apart flanges 60, 62 and engageable with the vehicle frame 12 at a location on the vehicle frame 12 spaced from the first and second pairs of spaced apart ears 52, 54. The stop 76 maintains the second frame 48 from pivotal movement about the first and second shafts 64, 66 and maintains the second supporting portion 50 at the second elevational position. In one embodiment of the stop 76, as best seen in FIGS. 5 and 7, an arm 78 is connected to the second frame 48 and extends from the second frame in a direction toward the vehicle frame 12. A stop flange 80 is connected to the arm 78 and extends from the arm in a direction substantially normal to the direction of extension of the arm 78. The stop flange 80 has a bore 82 disposed therethrough for receiving a third shaft 84. The mounting arrangement 26 also has a third pair of spaced apart ears 86 for receiving the stop flange 80 therebetween. The third pair of ears 86 have axially aligned bores 87 disposed therethrough for receiving the third shaft 84 and thereby maintaining connection between the third pair of ears 86 and the stop flange 80. The first, second, and third shafts 64, 66, 84 are retained in the respective apertures and bores 68, 70, 72, 74, 82 in any suitable manner so that inadvertent axial displacement is prevented, but easy access and removal is provided.

An alternate embodiment of the stop 76 is disclosed in FIG. 7 in phantom lines and in FIG. 8 in solid lines. In this embodiment the single arm and stop flange 78, 80 are replaced by a pair of spaced apart arms 88 and stop flanges 90. The pair of arms 88 and stop flanges 90 extend in identical directions to that of the arm 78 and stop flange 80, respectively. In the alternate embodiment, a pair of abutments 92, which are spaced apart in a transverse direction relative to the longitudinal axis 30, extend upward from the vehicle frame 12 at the first end portion 14 of the frame 12. The abutments 92 and the stop flanges 90 are transversely aligned relative to the longitudinal axis 30, on opposite sides of the axis 30, so that the stop flanges 90 hookingly engage the abutments 92 and prevent pivotal motion of the second frame 48 about the first and second shafts 64, 66. Therefore, the second frame 48 and especially the supporting portion 50 thereof is maintained at the second elevational location.

The second frame 48, as best seen in FIGS. 5, 7, and 8, includes first and second spaced apart tubular side frames 94, 96 each having a triangular configuration. The supporting portion 50 of the second frame 48 is defined by an upper side of each of the first and second tubular side frames 94, 96 when secured to the vehicle frame 12. Preferably, the supporting portion 50 of the tubular side frames 94, 96 are parallel to one another and extend in a substantially parallel direction relative to the vehicle axis 30 when mounted on the vehicle frame 12. The first and second spaced apart tubular frames 94, 96 which are maintained substantially elevationally parallel to each other and the longitudinal axis 30, are interconnected by first and second spaced apart tubular cross beams 98, 100. The first and second tubular cross beams 98, 100 are disposed between the first and second tubular side frames 94, 96 and secured to each of the side frames 94, 96 in any suitable manner, such as by welding. It is to be noted that the first and second spaced apart flanges 60, 62 are connected to the first and second tubular side frames 94, 96, respectively, at a location adjacent a lower apex of each of the frames 94, 96. The stop 76 is preferably connected to the first cross beam 98. Should a single stop 76 be utilized the location of the stop 76 is preferably mid-way between the first and second parallel tubular side frames 94, 96. When a pair of stops 76 are utilized each one is preferably located adjacent the first and second tubular side frames 94, 96, respectively.

The vehicle frame 12, and particularly the front end portion 14, includes a drive axle housing 102 which is usually constructed of cast iron or steel material and rigidly secured to suitable portions of the vehicle frame 12. It should be noted that the first and second spaced apart pairs of ears 52, 54 and the third pair of ears 86 or abutments 92 are secured to or formed as a portion of the drive axle housing 102. The drive axle housing 102 carries the drive axle components (not shown) as well first and second brake assemblies 104, 106 located adjacent opposite end portions of the drive axle housing 102.

Figure 6:
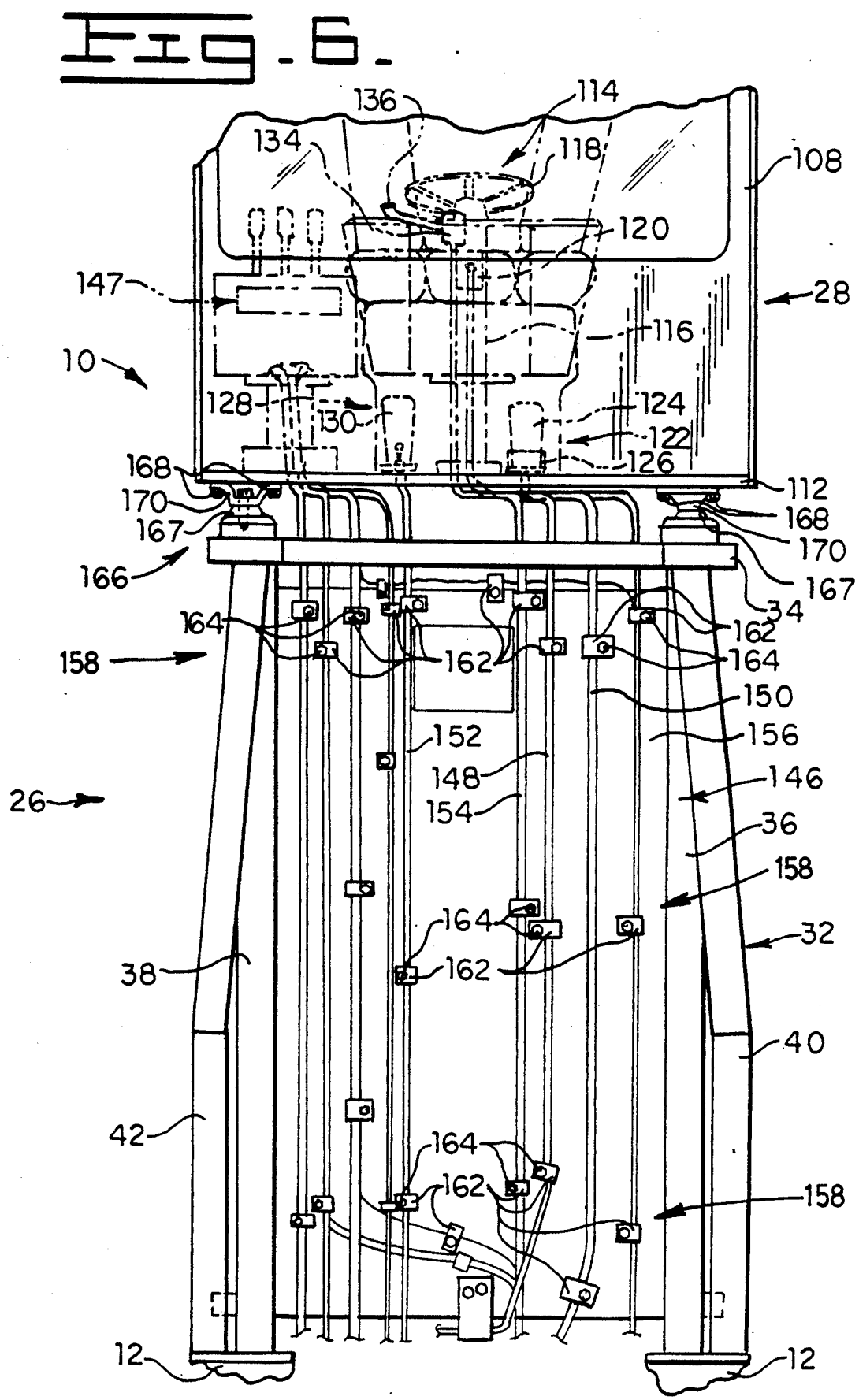
FIG. 6 is a front diagrammatic elevational view, taken along lines 6—6 of FIG. 4, showing the operator's station and directing means in greater detail.

With reference to FIG. 6, to enable the vehicle 10 to be driven from a cab 108 of the operator's station 28, a selecting means 110 is mounted on the operator's station 28. Preferably, the selecting means is mounted on a frame 112 of the operator's station 28. The selecting means 110 is adapted to deliver a control signal in response to selective manual actuation by the vehicle operator. The selecting means 110 preferably includes a steering selector 114 which includes a steering column assembly 116 mounted on the frame 112 of the operator's station. The steering column assembly 116 includes a steering wheel 118 which is rotatably connected to a steering valve 120. The steering valve 120 is responsive to rotation of the steering wheel 118 to deliver a fluid pressure signal and control actuation of a steering cylinder, not shown. A brake selector 122, which includes a brake pedal 124 and a brake valve 126 which is connected to the brake pedal 124 and selectively actuatable in response to selective movement of the brake pedal 124, delivers pressurized fluid for controlling the first and second brakes 104, 106 of the vehicle 10. Like the steering column assembly 116, the brake valve 126 and brake pedal 124 are mounted on the frame 112.

The selecting means 110 also includes an engine throttle selector 128 having a engine throttle pedal 130 which is pivotally connected to the frame 12. The selecting means 110 may also include a transmission selector 132 which controls the direction and/or gear speed range of the transmission (not shown). The transmission selector 132 preferably includes a switching mechanism 134 which is mounted on the steering column assembly 116. The switching mechanism 134 is selectively actuatable by a pivotally actuatable lever 136.

A plurality of controllable components 138 are mounted on the vehicle frame 12 at locations spaced from the operator's station 28. The controllable components 138 are adapted to vary operation of the vehicle functions in response to receiving a control signal from the selecting means 110. The controllable components 138 include, but are not limited to, a pilot operated steering valve 140 which is responsive to the steering valve 120 and actuatable to direct pressurized fluid flow to the steering cylinder (not shown). The controllable components 138 also include first and second wheel brakes 104, 106 which are connected to the first and second front drive wheels rotatably connected to opposite end portions of the drive axle housing 102. The brakes 104, 106 are preferably disc brakes and actuatable in response to actuation of brake valve 126. Such brakes of this type are well known in the art and will not be discussed in any greater detail.

The controllable components also include an engine speed control 142 of various types such as a governor, carburetor or any other suitable engine speed control. The engine speed control 142 is responsive to the position of the engine throttle pedal 130. Such devices are well known in the art and will not be discussed in any greater detail.

A plurality of transmission control valves 144 complete a partial list of the controllable components 138. The transmission control valves 144 are responsive to transmission selector 132 and particularly the switching mechanism 134 for controlling the direction and speed range of the vehicle 10, as indicated above. The transmission control valves 144 are preferably solenoid operated and responsive to electrical signals being delivered from the switching mechanism 134.

Other control valves 145 may be provided for controlling other functions of the vehicle 10 and lift mast assembly 18 operation. Such additional control valves 145 are controllable by the selecting means 110 located in the cab 108. The selecting means 110, for example, may include pilot valves 147 which deliver pressurized fluid signals to the control valves 145 for shifting the control valves 145 to cause actuation of the various functions of the lift mast assembly 18.

A directing means 146 is provided for passing the control signals from the selecting means 110 to the controllable components 138. The directing means 146 is connected to and between the controllable components 138 and the selecting means 110. Preferably, the directing means 146 includes, but is not limited to: at least one hydraulic conduit 148 connected to and between the steering valve 120 and the pilot operated steering valve 140 so that pilot control fluid may be passed therebetween; at least one hydraulic conduit 150 connected to and between the brake valve 126 mounted on cab frame 112 and the first and second brakes 104, 106 so that pressurized fluid flow may be passed from the brake valve 126 to the disc brakes 104, 106; a mechanical linkage assembly 152, including a push-pull cable, which is connected to and between the engine throttle pedal 130 and the engine speed control 142 so that pivotal movement of the engine throttle pedal 130 will affect a change in the speed of the engine through the engine speed control 142; and finally, at least one electrical conductor 154 connected to and between the switching mechanism 134 and the solenoid operated transmission control valves 144. The electrical conductor 154 delivers electrical signals from the transmission selector 132 to the solenoid operated transmission control valves 144 in response to a selection made by the vehicle operator via lever 136.

Each of the directing means 146 have a preselected length which is sufficient to permit movement of the operator's station 28 between the first and second elevational positions while the hydraulic conduits 148, 150, the mechanical linkage 152, and the electrical conductor 154 remain connected to the respective controllable components 138 and selecting means 110. Because the connections between the selecting means 110 and the controllable components 138 are not disturbed the potential for hydraulic fluid spillage, wire breakage, or linkage and cable crimping, bending, and the like are substantially reduced.

The directing means 146 (the conduits 148, 150, mechanical linkage 152, and electrical conductors 154) are releasably connected by fastening means 158 to supporting plate 156. The supporting plate 156 is connected to the first and second legs 36, 38 and maintains the directing means 146 at a predetermined oriented position on the vehicle. A cover plate 160 (FIG. 4) is removably connected to, the first and second spaced apart legs 36 and 38 in any suitable well-known conventional manner and spaced from the supporting plate 156. Preferably, the supporting plate 156 and cover plate are planar sheet metal members which are substantially parallel to each other and extend in an upright direction substantially parallel to the first and second legs 36, 38. The cover plate 160 and supporting plate 156 are provided to protect and support the hydraulic conduits 148, 150, the mechanical linkage 152, and the electrical conductors 154 disposed therebetween. The fastening means 158 preferably includes tabs 162 which are secured to the supporting plate 156 by threaded fasteners 164. The cover plate 160 which is removably connected to the first and second spaced apart legs 36, 38, in any suitable manner, is removed to provide access to the fastening means 158 so that the fastening means 158 may be also removed.

Upon removal of the threaded fasteners 164, which secured tabs 162 to the supporting plate 156, the directing means 146 is now free to move with the operator's station 28 between the first and second positions.

A connecting means 166 is provided for connecting the operator's station 28 to the supporting portion 34, 50 of the first and second frames 32, 48 respectively. The connecting means 166 preferably includes a plurality of resilient bushings 167 disposed between the frame 112 of the operator's station (cab) and the supporting portion 34, 50 of one of the first and second frames 32, 48. The connecting means 166 includes fastening means 168 which secures a carrier flange 170 of the connecting means 166 to either supporting portion 34 or 50 and frame 112 and between supporting portion 34 or 50 and frame 112. The carrier flange 170 is provided to support each resilient bushing 167 at each corner of frame 112 and on the supporting portions 34 and 50. The resilient bushings 167 dampen vibrations from being transferred between the cab 108 and the vehicle frame 12 and provides for increased operator comfort.

A method for relocating the cab 108 of the material handling vehicle 10 from the first elevational location on the frame 12 spaced from the longitudinal axis 30 to a second elevational location on the vehicle frame 12 spaced from the first elevational location and permitting the material handling vehicle to be controllably driven from the cab at both the first and second elevational locations includes the steps of: releasing the cab 108 from connection to a supporting portion 34 of the first frame 32 mounted on the vehicle frame 12 and by removing connecting means 166; lifting the cab 108 from being supported at the first elevational location on the first frame 32 by a crane, overhead hoist or other equivalent structure; placing the cab 108 at the second elevational location on a supporting portion 50 of a second frame 48 which is connected to the vehicle frame 12 at the front end portion 14 of the vehicle; and connecting the cab 108 to the supporting portion 50 of the second frame 12 at the second elevational location by connecting means 166.

The method also includes the steps of: supporting the lift mast assembly in an elevationally upright position by a overhead lifting device such as a crane; releasing the tilt cylinders 44 from connection to the lift mast assembly 18; releasing the lift mast assembly 18 from being connected to the first and second pairs of ears 52, 54 mounted on the front end portion 14 of the vehicle frame 12 by removing first and second shafts 64, 66; removing the lift mast assembly 18 from the vehicle frame 12 by the crane; positioning the first and second flanges 60, 62 of the second frame 48 between the first and second pairs of ears 52, 54 and the stop 76 in engagement with either the abutments 92 or the third pair of ears 86; connecting the second frame 48 to the first and second pairs of ears 52, 54 by inserting the first and second shafts 64, 66 into the apertures 88, 70, 74; and inserting the third shaft 84 in the bore 82 of the stop flange 80 and third pair of ears 86.

The method also includes the steps of: releasing the cover plate 160 from connection to the first and second legs 36, 38; removing the cover plate 160 from the vehicle 10; and releasing the fastening means 158 from connection to the supporting plate 156 so that movement of the directing means 146 with movement of the cab 108 between the first and second positions is allowed.

INDUSTRIAL APPLICABILITY

With reference to the drawings and particularly FIGS. 1, 2, and 3, the sequence of moving the high mounted vehicle cab 108 from the first elevational location to the second elevational location is depicted. In order to transport a large vehicle 10 such as a container handling lift truck as shown, it is necessary to prepare the vehicle prior to transportation so that the overall height of the vehicle 10 is less than the overhead requirements of highway overpasses, tunnels, passageways on ships, and other overhead obstructions. When a large vehicle such as this is to transported it is necessary that the lift mast assembly 18 and operator's station 28 be removed so that the minimum clearance requirements are achieved. Typically, removal of the operator's station 28 disables the vehicle 10 so that it can no longer be driven by an operator and therefore must be towed, pushed, or lifted. The embodiment of this invention overcomes the driveability problem by allowing the operator's station 28 to be relocated on the vehicle without requiring disconnection of the directing means 146 (hydraulic conduits 148, 150, mechanical linkage 152, and electrical conductor 154).

To achieve driveability and acceptable overall height so that the vehicle can be transported by trailer, train, or ship, the lift mast assembly 18 is connected to a crane, hoist, or some other overhead device and supported thereby so that the tilt cylinders 44 and the lift mast at the pivotal connection to the front end 14 of the vehicle frame 12 may be released. By removing first and second shafts 64, 66 and third shaft 84 when appropriate, the lift mast assembly 18 is then freed from connection to the vehicle 10 and now prepared for lifting. The lift mast assembly 18 is then removed from the vehicle frame 12. RemoVal of the cover plate 160 and the fastening means 158 frees the directing means 146 are to move with the cab 108 from an elevationally oriented position to a horizontal position as shown in FIG. 5.

The second frame 48 is mounted on the front end portion 14 of the vehicle frame 12 at the location from which the lift mast assembly 18 was removed. Specifically, the first and second flanges 60, 62 are positioned between the first and second pairs of ears 52, 54 and the first and second shafts 64, 66 are disposed in the first and second apertures 68, 70, respectively, and in the apertures 74 of the first and second flanges 60, 62, respectively. To maintain the supporting portion 50 of the second frame 48 substantially parallel to the supporting portion 34 of the first frame 32 and at the preselected spaced apart distance from the supporting portion 34 the stop 76 is disposed between the third pair of ears 86 or abutments 92 so that pivotal movement about the first and second shafts 64, 66 is prevented and the supporting surface 50 is maintained at the second position. In the situation where the third pair of ears 86 is provided a third shaft 84 is disposable in the bore 82 of the stop flange 80 and the bores 87 of the third pair of ears 86 to retain the stop 76 in position and the second frame 48 from pivotal movement. Upon completion of mounting the second frame 48 on the vehicle the operator's station 28 is then lowered by the lifting device to the second position. The connecting means 166 are utilized to attach the cab frame 112 to the supporting portion 50 and retain the cab at the second position. At this position the selecting means 110 is operative so that the vehicle may be controlled by the vehicle operator and driven into position for transportation by trailer, ship, or rail. Therefore, maneuvering of the vehicle is easily accomplished.

Because the operator's station 28 when at the second position is at a substantially lower elevation than at the first position, the cab is now low enough to be able to clear the aforementioned overhead obstacles.

Other aspects, objects, advantages, and uses of this invention can be obtained from a study of the drawings, the disclosure, and the appended claims.

I claim:

1. A mounting arrangement for facilitating the positioning of an operator's station on the frame of a work vehicle at a plurality of elevationally spaced apart positions relative to a longitudinal axis of the work vehicle comprising:

a first frame having a supporting portion and being connected to the vehicle frame, said supporting portion being spaced a first preselected elevational distance from the longitudinal axis and defining a first position at which the operator's station is supportable;

a second frame having a supporting portion and being connectable to the vehicle frame, said second frame supporting portion being elevationally spaced from said first frame supporting portion and defining a second elevational position at which the operator's station is supportable;

connecting means for connecting said operator's station to the supporting portion of the first and second frames;

a lift mast assembly;

means for releasably connecting a selected one of the lift mast assembly and the second frame to the vehicle frame, said lift mast assembly and second frame each having first and second spaced apart flanges and an aperture disposed through each of said flanges, said releasable connecting means including;

a first pair of spaced apart ears connected to the vehicle frame, said ears each having an aperture and said apertures being axially aligned;

a second pair of spaced apart ears connected to the vehicle frame; said second pair of ears each having and aperture and said apertures of the second pair or ears being axially aligned, said first flange being disposable between the ears of the first pair or ears and said second flange being disposable between the ears of the second pair of ears;

a first shaft disposable in the apertures of the first pair of ears and the first flange; and a second shaft disposable in the apertures of the second pair of ears and the second flange.

2. A mounting arrangement, as set forth in claim 1, including a stop connected to said second frame at a location on the second frame spaced from the first and second spaced apart flanges and engageable with the vehicle frame at a location on the vehicle frame spaced from the first and second pair of spaced apart ears, said stop maintaining said second frame from pivotal movement about the first and second shafts and thereby maintaining said second supporting portion at the second elevational position.

3. A mounting arrangement, as set forth in claim 2, wherein said stop includes:

a stop flange having a bore; .

a third pair of spaced apart ears each having aligned bores and being connected to the vehicle frame, said stop flange being disposed between the third pair of spaced apart ears; and a third shaft disposable in the bores of the third pair of ears and in the bore of the stop flange.

4. A mounting arrangement, as set forth in claim 2, wherein said stop includes:

an arm connected to the second frame and extending from said second frame in a direction toward said vehicle frame;

stop flange connected to the arm and extending from said arm in a direction substantially normal to said arm; and an abutment mounted on the frame and hookingly engageable by the stop flange.

5. A mounting arrangement, as set forth in claim 1, wherein said second frame includes:

first and second spaced apart tubular side frames having a triangular configuration, said supporting portion of the second frame being defined by a side of each of the first and second tubular side frames;

first and second spaced apart tubular cross beams connected to and between the first and second spaced apart tubular side frames;

first and second flanges each having a bore and being connected to the first and second tubular side frames, respectively; and a stop connected to the first cross beam and engageable with the vehicle frame, said stop maintaining said second frame from pivotal movement about the first and second shafts and thereby retaining the supporting portion of the second frame at the second elevational position.

6. A mounting arrangement, as set forth in claim 5, wherein said vehicle frame includes a drive axle housing, said first and second spaced apart pairs of ears being connected to the drive axle, and said stop including:

a projection connected to said drive axle housing, and a flange connected to the second frame and engageable with the projection.

7. A mounting arrangement, as set forth in claim 5, wherein said vehicle frame includes a drive axle housing and said first and second pairs of spaced apart ears being connected to the drive axle housing, said stop includes:

a stop flange having a bore;

a third pair of spaced apart ears each having aligned bores and being connected to the drive axle housing, said stop flange being disposable between the third pair of spaced apart ears; and a third shaft disposable in the bores of the third pair of ears and in the bore of the stop flange.

8. A method for relocating an operator's station of a material handling vehicle from a first elevational location on a frame of the vehicle spaced from a longitudinal axis of the vehicle to a second elevational location on the vehicle frame spaced from the first elevational location, said material handling vehicle being controllably driven from the operator's station at both the first and second elevational locations, including the steps of:

releasing a lift mast from being connected to first and second pairs of ears mounted on the vehicle frame;

removing the lift mast from the vehicle frame;

connecting the second frame to the first and second pairs of ears;

releasing the operator's station from connection to a supporting portion of a first frame mounted on the vehicle frame;

lifting the operator's station from being supported at said first elevational location on the first frame;

placing the operator's station at said second elevational location on a supporting portion of a second frame connected to the vehicle frame; and connecting the operator's station to the supporting portion of the second frame at said second elevational location.

9. A method for relocating an operator's station of a material handling vehicle from a first elevational location on a frame or the vehicle spaced from a longitudinal axis of the vehicle to a second elevational location on the vehicle frame spaced from the first elevational location, said material handling vehicle being controllably driven from the operator's station at both the first and second elevational locations, said material handling vehicle includes; means for delivering a control signal in response to selective manual actuation, selecting means mounted on the operator's station, a controllable component mounted on the frame, and means for passing the control signal to the controllable component, said directing means being connected to and between the selecting means and the controllable component, a supporting plate, and a fastening means for releasably connecting said directing means to said supporting plate, a cover plate connected to the first frame and covering said directing means, including the steps of:

releasing said cover plate from connection to the first frame;

removing said cover plate from said vehicle;

releasing the fastening form connection to said supporting plate;

releasing the operator's station from connection to a supporting portion of a first frame mounted on the vehicle frame;

lifting the operator's station from being supported at said first elevational location on the first frame;

moving the directing means with the operator's station;

placing the operator's station at said second elevational location on a supporting portion of a second frame connected to the vehicle frame; and connecting the operator's station to the supporting portion of the second frame at said second elevational location.

10. A material handling vehicle having a frame, a longitudinal vehicle axis, an operator's station, and a lift mast assembly, comprising:

a first frame having a supporting portion and being connected to the vehicle frame, said supporting portion being spaced a first preselected elevational distance from the longitudinal axis and defining a first elevational position at which the operator's station is supportable;

a second frame having a supporting portion and being connectable to the vehicle frame;

means for releasing said lift mast assembly from being connected at a preselected location to said vehicle frame and for connecting said second frame to said vehicle frame at said preselected location, said means maintaining the supporting portion at a preselected elevational location spaced from the first frame supporting portion, and said supporting portion defining a second elevational position at which the operator's station is supportable;

a controllable component mounted on the vehicle frame at a location spaced from the operator's station and being adapted to vary operation of a function of the vehicle in response to receiving a control signal;

selecting means for delivering a control signal in response to selective manual actuation, said selecting means being mounted on the operator's station;

directing means for passing control signals from the selecting means to said controllable component, said directing means being connected to and between the controllable component and the selecting means;

connecting means for releasably connecting said operator's station to the supporting portion of the first and second frames, said directing means being connected to and between the selecting means and the controllable component at each of the first and second positions of the operator's station and said vehicle being controllable from the operator's station at both of the first and second positions.

11. A material handling vehicle, as set forth in claim 10, wherein aid directing means includes at least one of a hydraulic conduit, an electrical conductor, a cable and a mechanical linkage, said directing means having a preselected length and being connected to and between the controllable component and the selecting means, said preselected length of the directing means being sufficient to permit movement of the operator's station between the first and second elevational positions with the said one of the hydraulic conduit, electrical conductor, cable and mechanical linkage being connected to and between the controllable component and the selecting means.

12. A material handling vehicle, as set forth in claim 11, wherein said operator's station includes a cab having a frame and said selecting means includes a selective one of a steering selector, a brake selector, an engine throttle selector, a direction selector and a transmission selector connected to said cab frame.

13. A material handling vehicle, as set forth in claim 11, wherein said first frame includes:

first and second spaced apart elevationally oriented spaced apart legs;

a supporting plate connected to the first, and second legs;

fastening means for releasably connecting said one of the hydraulic conduit, electrical conductor and mechanical linkage to the supporting plate;

a cover plate removably connected to the first and second spaced apart legs and spaced from said supporting plate, said one of the hydraulic conduit, electrical conductor, cable and mechanical linkage.

* * * * *